United States Patent [19]

Battle

[11] 4,315,535
[45] Feb. 16, 1982

[54] FLOOD PROTECTION CONTAINER FOR VEHICLES

[76] Inventor: Daniel S. Battle, 2473 N. Rampart St., New Orleans, La. 70117

[21] Appl. No.: 173,992

[22] Filed: Jul. 31, 1980

[51] Int. Cl.$^3$ .............................................. B65D 81/18
[52] U.S. Cl. ...................................... 150/11; 53/464; 150/52 K
[58] Field of Search ................. 150/52 K, 11; 53/459, 53/464; 296/136; 206/335

[56] References Cited

U.S. PATENT DOCUMENTS

| | | | |
|---|---|---|---|
| 1,691,379 | 11/1928 | Christ | 206/335 X |
| 2,646,097 | 7/1953 | Gaverth | 150/52 K |
| 2,766,797 | 10/1956 | Cowen | 150/11 X |
| 2,801,667 | 8/1957 | Curran | 150/52 K |
| 3,474,803 | 10/1969 | Davis | 150/52 K X |
| 3,599,690 | 8/1971 | Christie | 150/11 |

FOREIGN PATENT DOCUMENTS 496156 11/1938 United Kingdom ................. 150/11

*Primary Examiner*—Donald F. Norton
*Attorney, Agent, or Firm*—Keaty & Garvey

[57] ABSTRACT

A flood protection apparatus for vehicles which comprises the unitary flexible container, having at least a bottom, and a continuous side wall integrally and sealably connected thereto and extended upward during operation, an upper orifice in the container for receiving a vehicle within, a length of cord housed within a continuous channel on the uppermost end of the side wall for constricting the orifice of the container after the vehicle has been placed within, at least one marking place on the bottom of the container running its length, and up at least one side of the container for indicating placement of the tires of the vehicle within the container. The walls of the container are collapsible, and the container material would be a multi-layer flexible material, with the outer most and inner most layers being plastic based, and the middle layer being a canvas type material.

11 Claims, 4 Drawing Figures

FLOOD PROTECTION CONTAINER FOR VEHICLES

BACKGROUND OF THE INVENTION

1. Field of the Invention

The present invention relates to flood protection systems for automobiles and the like. Even more particularly, the present invention relates to a flood protection system for an automobile and the like which would utilize a unitary body, multi-layered bag wherein the car would be placed thus providing a flood-proof covering around the entire automobile body.

2. General Background and Prior Art

In the protection of automobiles, one of the most feared occurances which automobile owners and dealers have to cope with are the instances of flooding. Because of the maneuverability of automobiles, coupled with the fact that the most sensitive areas of the automobiles, i.e. the engine, transmission, bearings, steering, etc., are exposed to the elements, thus, when a flood would occur, rising water would tend to get into the engine, resulting in the automobile not starting once the flood waters recede, or even worse, the automobile engine being ruined due to rust, etc. Also, especially in those states which are inseparable to the onslaught of hurricanes, it is not uncommon that rising waters are sometimes brackish or salt water. This being the case, once salt water has gotten into the engine of a car, or indeed has even made contact with the undercoating or the paint, the result is that the undercoating eventually peels off and rusting of the automobile sets in very quickly.

There are several prior art patents which address themselves to the problem of preventing the car from being exposed to moisture, but should address themselves to the problem of flooding, that is, the onslaught of rising waters and/or a flood wave.

U.S. Pat. No. 3,929,178 issued to C. D. Hicky and entitled "Flexible Containers" would teach the use of a flexible container for the storage of a vehicle, with the use of a flexible impermiable cover with a sealing means adapted to cooperate with the channel to provide a fluid type seal.

U.S. Pat. No. 3,474,803 issued to E. F. Davis and entitled "Automobile Enclosure" provides for an impervious receptacle into which an automobile vehicle may be entered and withdrawn as desired, and which could be effectively sealed against moisture and dirt to maintain the received vehicle in substantially the same condition.

U.S. Pat. No. 3,884,523 issued to B. S. Allen and entitled "Protective Covering for a Vehicle" would teach the use of a cover which could be pulled out of the seat of a motor cycle which would then cover the entire motor cycle.

U.S. Pat. No. 1,691,379 issued to A. Christ, Jr. and entitled "Shipping Cover Bag" would teach the use of a water-proof, dust tight and simulastic covering for vehicle bodies and other highly finished objects.

U.S. Pat. No. 2,311,514 issued to O. Bramblet and entitled "Portable Shelter for Motor Vehicles" would teach the use of an entirely closed structure which completely houses the machines so that it would be effectively sheltered from the weather. It should be noted from the drawings that the shelter would be open-ended at the ground.

U.S. Pat. No. 4,140,191 issued to C. D. Hicky and entitled "Storage of Wheel Vehicles" would teach the use of a sealed container for storing a vehicle having a continuous channel with sealing means for sealing the periphery of the cover into said channel to provide a fluid-tight seal therewith.

U.S. Pat. No. 2,712,845 issued to R. F. Lange and entitled "Protective Covering" and would teach the use of a protective covering for a vehicle by overlaying the protective covering around the vehicles. It should be noted that again, this protective covering would not extend to the ground.

3. General Discussion of the Present Invention

The present would solve the prior art problems and shortcomings in a simple, inexpensive and straightforward manner. The present invention would provide for a multi-layered container adapted with a top side opening and flexible, collapsable sides, to accommodate a normal vehicle or the like, by allowing the vehicle to be driven over the collapsable sides and onto the interior surface of the bag apparatus which would be in contact with the ground. The interior surface in which the vehicle is placed would be adapted with indelible marking for indicating proper placement of the tires. Following placement of the vehicle, the collapsable sides would be lifted up around the vehicle, and the opening would then be gathered together by a "pull string" or the like so that the vehicle would then be completely encased by the multi-layered flood-proof material with a singular opening located above the vehicle to afford air entrance and release from the bag when the force of rising flood waters ensue, and possibly avoid air trapment within the bag which may result in floating of the entire apparatus.

Thus, it is an object of the present invention to provide a flood-proof protection system for vehicles and the like.

It is another object of the present invention to provide a simply constructed, unitary container for vehicles for protection against moisture, particularly flooding.

It is still another object of the present invention to provide a single, unitary, multi-layered "bag" for containing a vehicle against flooding.

It is a further object of the present invention to provide a unitary container with collapsable sides for accomodating a vehicle being driven over said sides while collapsed and onto the inner surface of the container.

It is still a further object of the present invention to provide a container for vehicles adapted with a means for closing said container, said closing in the closed state being across the top of the vehicle.

It is still a further object of the present invention to provide a container wherein upon closing of the container, the closure would still allow air to enter and exit the container, yet protecting against rising flood waters.

It is yet a further object of the present invention to provide a container having markings on the floor and at least one inner side therein, so that when the side is collapsed, the markings indicate the positioning of the vehicle onto the floor of the container.

It is still a further object of the present invention to provide a container which is made up of a material essentially multi-layered.

BRIEF DESCRIPTION OF THE DRAWINGS

Of further understanding of the nature and object of the present invention, reference should be had to the following detailed description, taken in conjunction with the accompanying drawings, in which like parts are given like reference numerals and, wherein.

DETAILED DESCRIPTION OF THE PREFERRED EMBODIMENT

Figure 1:
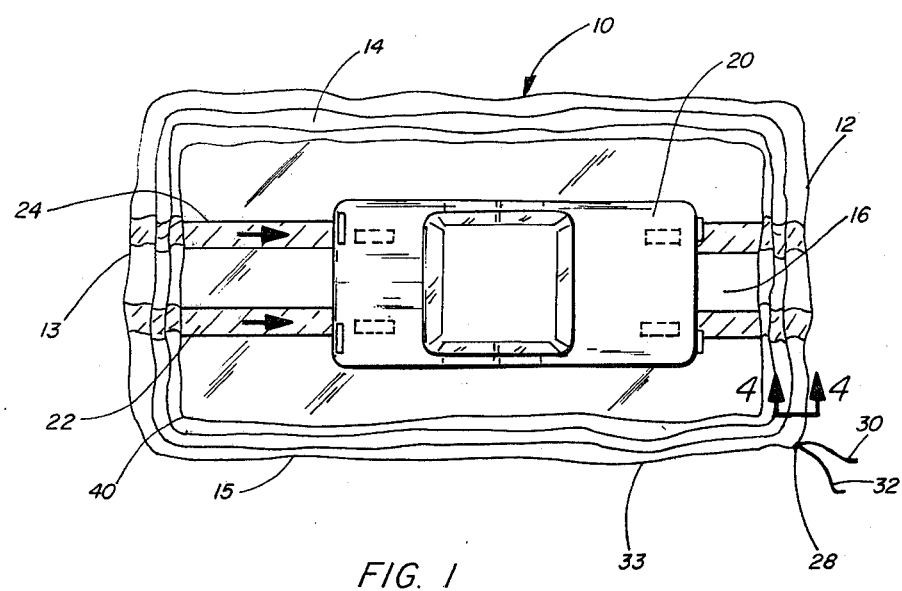
FIG. 1 is a top view of the preferred embodiment of the present invention wherein the sides are collapsed around the vehicle within.

FIG. 1 best illustrates the preferred embodiment of the apparatus of the present invention designated generally by the numeral 10. In FIG. 1 there can be seen continuous collapsable side portions 12 through 15 forming generally a rectangular area surrounding floor surface portion 16. Sidewalls 12 through 15 could be considered a continuous side portion integrally and sealably attached to the bottom portion, and, in the preferred embodiment defining a rectangular space of the dimensions approximately thirteen (13') feet in length by eight (8') feet in width, adaptable to larger or smaller sizes for larger or smaller vehicles. Also illustrated in FIG. 1 is vehicle 20 which has been placed, in most instances, by being driven within the confines of sidewalls 12 through 14 and onto floor area 16. Vehicle 20 as indicated, as been placed in position by following markers 22 and 24 which would be as seen in FIG. 1 applied to the inner side of either sidewall 13 or 12, and contiguous with the floor surface 16. It should be noted that in a collapsed state, as seen in FIG. 1, the markers 22 and 24 would indicate a continuous pathway for the vehicle tires from the outside through the floor area of the container. Further illustrated in FIG. 1 would be drawstring 28 having ends 30 and 32 which would be threaded through interior channel 33 within the extreme top portion of sidewalls 12 through 15. Following the placement of vehicle 20 in the container 10, sidewalls 12 through 15 would then be raised above the level of the vehicle, and the pulling taut of the ends 30 and 32 of drawstring 28 would constrict orafice 40 around the top portion of the vehicle as seen in FIG. 2.

Figure 2:
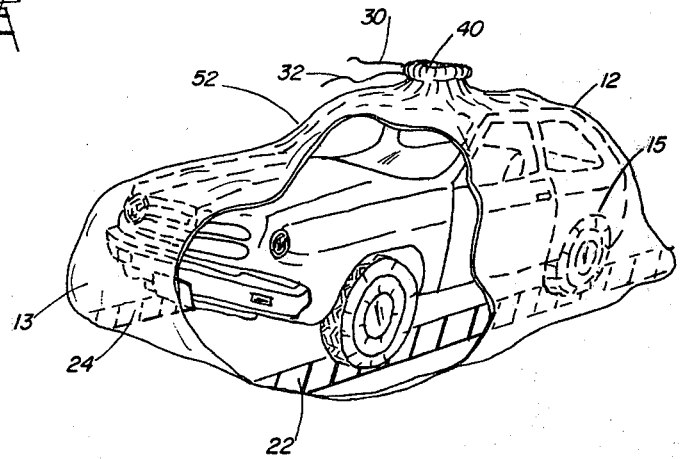
FIG. 2 is a perspective view of the preferred embodiment of the apparatus of the present invention illustrating a vehicle enveloped within after the sides have been pulled up around the vehicle.

FIG. 2 would illustrate more clearly in a schematic cutaway side view, the result of having pulled taut the ends 30 and 32 of drawstring 28. It can be clearly seen from FIG. 2, that the continuous sides 12 through 15 of apparatus 10, have in effect being pulled upward and around vehicle 20, and because of their being flexible and collapsable, encase vehicle 20 within the confines of the sidewalls 12 through 15, the sidewalls generally conforming to the shape of the vehicle. The result is that the orafice 40 which is in the highly constricted state, remains a much reduced orafice 40 above the roof of the vehicle. It should be noted that the side portions 12 through 15 have been drawn up to the point that rising water (the level of water is indicated by dotted line 52) could reach the level of the windows of the vehicle and still not enter into the space within the impermeable container 10.

Figure 3:
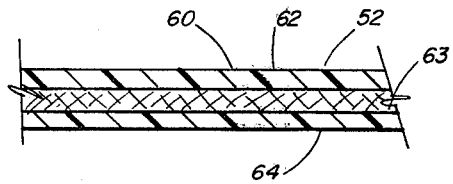
FIG. 3 is a sectional view of the fabric of the apparatus of the present invention illustrating the multi-layer construction.

FIG. 3 would illustrate a cross-sectional view of the fabric which would be utilized in the preferred embodiment of apparatus 10. It should be noted that the fabric 60 is comprised of outer layer 62, middle layer 63 and inner layer 64. Because of the necessity that the fabric have the ability to withstand the on-rush of flooding waters, and the weight of a vehicle as it is moved over the collapsed sides of the apparatus as shown in FIG. 1, the fabric must be very flexible yet still durable. Outer layer 62 would be of a flexible rubber-base compound which would be impermiable to water or moisture. In order to increase its strength and durability, middle layer 63 would be comprised of a canvas-like layer which would have the effect of adding tensil strength to the fabric in the overall structure. Inner layer 64, likewise, would also be of a rubber-base compound in the event that a puncture would ensue on the outer layer perhaps caused by branches or the like floating in the water and striking the apparatus during a flood. The middle layer, would, in all likelihood, withstand the most strikes against the apparatus, but since it would not necessarily be water-proof, the inner layer 64 would have the added protection of preventing flood waters from leaking into the apparatus due to the puncture of outer layer 62 and seepage of water through middle layer 63.

Figure 4:
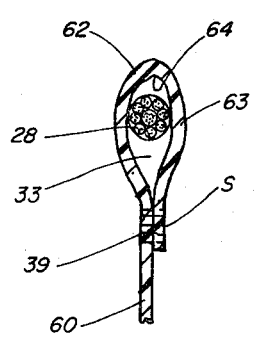
FIG. 4 is a view of the continuous channel housing the draw cord of the apparatus of the present invention along the lines 4—4 of FIG. 1.

FIG. 4 would illustrate a cross-sectional view of continuous channel 33 as it would house drawstring 28. Also illustrated in that view is multi-layer material made up of the inner and outer rubber-base material and the middle layer being of canvas material. The channel would be formed by simply lapping the end of sidewalls over with adhesion after the lapping through stitching or the like as shown at point 39. This channel 33 would be continuous as it encircled the entire upper ends of the sidewalls 12 through 15 and housing draw cord 28, with the ends 30 and 32 extruding outward, as shown in FIG. 2.

It should be made clear that in the preferred embodiment of the apparatus of the present invention, apparatus 10 would be of a flexible material throughout so that it would have the ability to be rolled up and/or stored within one's home or perhaps even in the trunk of one's car of the back of a type of truck vehicle. That being the case, apparatus 10 would have the added attraction of being carried about with the car, in the event that sudden flooding would occur, one would have the possible opportunity to set up the apparatus and utilize it on the spot.

Because many varying and different embodiments may be made within the scope of the inventive concept herein taught, and because many modifications may be made in the embodiments herein detailed in accordance with descriptive requirement of the law, it is to be understood that the details herein are to be interpreted as illustrative and not in a limiting sense.

What is claimed in this invention is:

1. A flood protection apparatus for vehicles, comprising:
   a. a unitary flexible container, having at least a bottom, and a continuous sidewall integrally and sealably connected thereto and extending upward during operation;
   b. an upper orifice in the container for receiving a vehicle within;
   c. a length of cord housed within a continuous channel on the uppermost end of the sidewall for constricting the orifice of the container after the vehicle has been placed within;
   d. at least one marking placed on the bottom of the container running its length, and up one side of the container for indicating placement of the tires of the vehicle within the container.

2. The flood protection apparatus in claim 1, wherein the side wall is collapsable.

3. The flood protection apparatus in claim 1, wherein the container is further comprised of a multi-layer of flexible material with the outermost layer being a rubber based, water-impermeable substance.

4. The flood protection apparatus in claim 3, wherein the middle layer is a canvas-type material.

5. The flood protection apparatus in claim 3, wherein the innermost layer is a rubber base, water-impermeable substance.

6. The flood protection apparatus in claim 1, wherein the markings on the bottom and sidewall of the container indicates a continuous pathway for the tire of the vehicle when the sides of the container are collapsed.

7. A method of protecting vehicles from rising water, comprising the following steps:
   a. providing an open-ended container having a bottom portion with dimensions of at least thirteen (13') feet in length and eight (8') feet in width, and having a continuous collapsable side integrally attached to the bottom portion for providing a water-impermeable container;
   b. collapsing the side of the container so that the side is substantially flush with the bottom portion of the container;
   c. providing markings on the bottom portion and up one side of the container for indicating the position of the vehicle being placed within the container;
   d. moving a vehicle into the container while in the collapsable state;
   e. raising the side of the container to a level wherein the open end is at least above the vehicle's uppermost portion;
   f. constricting the open end of the container by the use of a length of cord housed within a continuous channel on the uppermost end of the sidewall of the container;
   g. securing the ends of the length of cord so that the container side remain enveloped around the vehicle contained therein.

8. The method in claim 7, wherein the open-ended container is comprised of a multi-layer material, the innermost and outermost layers are a rubber-based, water-impermeable substance, and the middle layer is a canvas-type material.

9. A flood protection apparatus for vehicles, comprising:
   a. a unitary flexible container having a bottom portion and a continuous side portion integrally and sealably attached thereto, defining an open-ended envelope within; said side and bottom portions being further comprises of a multi-layer, flexible material with the outermost and innermost layers being of rubber base, water-impermeable substance, and the middle layer being of canvas material;
   b. an orifice in the top side of the container for receiving the vehicle within;
   c. a length of cord-like material housed within a continuous channel located on the uppermost end of the side of the container for constricting the orifice of the container when the cord is pulled taut, enclosing the container sides around a vehicle within;
   d. markings on the bottom portion and at least a portion of one inner wall of said side portion of the container for indicating the placement of the vehicle within the container when the vehicle is placed therein, said marking indicating a continuous longitudinal guide for the tires of the vehicle, while the side is in the collapsed state.

10. The apparatus in claim 9, wherein said side portion is collapsible to a position substantially flush with said bottom portion.

11. The apparatus in claim 9, wherein said constricted orifice allows air passage between the inside of said container and the outside atmosphere.

* * * * *